United States Patent [19]
Buchner et al.

[11] 4,214,699
[45] Jul. 29, 1980

[54] PARKING HEATER AND METHOD USING HYDRIDES IN MOTOR VEHICLES POWERED BY HYDROGEN

[75] Inventors: Helmut Buchner, Wendlingen; Helmut Säufferer, Esslingen, both of Fed. Rep. of Germany

[73] Assignee: Daimler-Benz Aktiengesellschaft, Stuttgart, Fed. Rep. of Germany

[21] Appl. No.: 894,812

[22] Filed: Apr. 10, 1978

[30] Foreign Application Priority Data

Apr. 9, 1977 [DE] Fed. Rep. of Germany ....... 2715990

[51] Int. Cl.³ .............................................. B60H 1/02
[52] U.S. Cl. ................................... 237/12.3 C; 62/48; 123/1 A; 123/DIG. 12; 123/142.5 R; 423/248; 423/648 R
[58] Field of Search ............... 62/48, 238 E; 123/1 A, 123/DIG. 12, 142.5 R; 237/12.3 C; 34/15; 165/DIG. 17, 104 S; 423/248, 648 R

[56] References Cited

U.S. PATENT DOCUMENTS

| | | | |
|---|---|---|---|
| 3,618,854 | 11/1971 | Frank | 237/12.3 B |
| 3,732,690 | 5/1973 | Meijer | 123/1 A |
| 3,777,975 | 12/1973 | Kofink | 237/12.3 C |
| 3,922,872 | 12/1975 | Reilly et al. | 62/48 |
| 4,018,190 | 4/1977 | Henault | 123/DIG. 12 |
| 4,039,023 | 8/1977 | McClaine | 165/DIG. 17 |
| 4,040,410 | 8/1977 | Libowitz | 165/DIG. 17 |
| 4,044,819 | 8/1977 | Cottingham | 165/DIG. 17 |
| 4,051,888 | 10/1977 | Yamada et al. | 165/DIG. 17 |
| 4,087,047 | 5/1978 | Wulf et al. | 237/12.3 C |
| 4,096,639 | 6/1978 | Sandrock | 34/15 |
| 4,096,641 | 6/1978 | Sandrock | 34/15 |
| 4,161,211 | 7/1976 | Duffy et al. | 62/48 |

OTHER PUBLICATIONS

Buchner et al., ATZ 4/76, *Hydrogen as an Alternative Fuel for Otto Engines.*
Hendriksen et al., Billings Energy Research Corp. Conference Proceedings of the First World Hydrogen Energy Conference, Mar. 1976: *Prototype Hydrogen Automobile Using a Metal Hydride.*
Advances in Cryogenic Engineering: The UCLA Hydrogen Car, Bush, A. F. et al., 1973, pp. 23–27.

*Primary Examiner*—Ronald C. Capossela
*Attorney, Agent, or Firm*—Browdy and Neimark

[57] ABSTRACT

The passenger compartment of a motor vehicle operated at least partially on hydrogen may be heated after the engine is shut off by using a LT/HT hydride combination reservoir as the hydride reservoir for the vehicle. The heat capacity of the reservoir, present after the engine is shut off or produced by charging the HT reservoir with hydrogen from the LT reservoir, is supplied at least partially to the passenger compartment.

15 Claims, 2 Drawing Figures ary object of the present invention is the use of the
heat capacity of hydride reservoirs for heating purposes, especially as parking heaters for motor vehicles
operated at least partially with hydrogen, maintaining
the minimum pressure of 1 bar above the reservoir
which is necessary to restart the engine.

This goal is achieved by virtue of the fact that an
LT/HT hydride combination reservoir is used as a
hydride reservoir, and the heat of the reservoir, stored

PARKING HEATER AND METHOD USING HYDRIDES IN MOTOR VEHICLES POWERED BY HYDROGEN

FIELD OF THE INVENTION

The present invention relates to methods and apparatus for supplying heat to a parked motor vehicle, and more particularly to a zero-cost, zero-weight and zero-fuel parking heater.

BACKGROUND OF THE INVENTION

Recently, successful tests have been conducted to make the exhaust gases from Otto engines less environmentally harmful in their composition, by at least partial replacement of gasoline. The possibility of operating engines at least partially with hydrogen has been described in several publications, such as "Hydrogen as an Alternative Fuel for Otto Engines" by H. Buchner and H. Saufferer in ATZ 4/76 and "Prototype Hydrogen Automobile Using a Metal Hydride" by D. L. Hendriksen, D. B. Mackay, V. R. Anderson, Billings Energy Research Corporation in *Conference Proceedings of the First World Hydrogen Energy Conference*, March 1976, Miami, 7c 1-12.

Until recently, the main obstacle to using hydrogen-powered vehicles was the voluminous, dangerous, and energy-consuming storage of hydrogen in the gaseous or liquid form. Only the development of suitable metal hydride reservoirs has made hydrogen drive significant once more.

These metal hydrides can be classified roughly into two groups, namely the so-called low-temperature hydrides (LT hydrides) and high-temperature hydrides (HT hydrides). The release of hydrogen from the hydrides is an endothermal reaction, while storage is an exothermal reaction. The hydrogen must have a pressure of at least 1 bar so that it can be fed to the engine without using a compressor; the equilibrium temperature, at which this pressure is obtained above the hydride reservoir, in the case of LT reservoirs, ranges from less than 0° C. to temperatures equal to or slightly above room temperature, while these temperatures are at 200° C. or more in HT reservoirs.

The heat of liberation for $H_2$ can be supplied in the case of LT reservoirs for example by the radiator water or the ambient air, while in HT reservoirs the exhaust heat can be used for this purpose (as shown in FIG. 2).

According to a previous proposal, the heat required to release the hydrogen from LT reservoirs is drawn from the ambient air, and this heat requirement is used to cool the interiors of motor vehicles.

It has been found that the heat capacity of heated hydride reservoirs can also be used for heating purposes without influencing the functioning ability of the reservoir for motor operation.

SUMMARY OF THE INVENTION

An object of the present invention is the use of the heat capacity of hydride reservoirs for heating purposes, especially as parking heaters for motor vehicles operated at least partially with hydrogen, maintaining the minimum pressure of 1 bar above the reservoir which is necessary to restart the engine.

This goal is achieved by virtue of the fact that an LT/HT hydride combination reservoir is used as a hydride reservoir, and the heat of the reservoir, stored by engine operation or by charging with hydrogen, is utilized.

For this purpose, the reservoir is brought into heat-transfer connection with the space to be heated and the heat which is given off as the reservoir cools or the heat produced as the reservoir is charged is given up at least partially to the space to be heated.

Thus, the use of high-temperature hydrides (HT reservoirs) in conjunction with low-temperature hydrides (LT reservoirs) in vehicles with hydrogen or hydrogen/gasoline mixed fuel operation allows a zero-cost and zero-fuel efficient parking heater for hydride-powered motor vehicles.

Examples of suitable hydrides in the case of LT reservoirs are, in particular, TiFe hydrides, but also $LaNi_5$ and other alloys of rare earths with iron, cobalt, and nickel, while in the case of HT reservoirs, $Mg_2Ni$ as well as magnesium hydride are particularly advantageous. Such alloys modified by doping are also suitable.

Since the engineering and design of heat exchangers are theoretically known, and the heat exchangers used herein are similarly arranged and designed in principle, as described in an older proposal for cooling interior spaces of motor vehicles, they require no further explanation here. It should only be pointed out that the heat exchanger of the HT reservoir which is required for warm-up for releasing hydrogen through engine operation, is supplemented by a heat exchanger to remove heat from the reservoir and supply it to the space to be heated.

The LT reservoir as well as the HT reservoir are each heat insulated and jointly form the hydride combination hydrogen tank.

DETAILED DESCRIPTION OF PREFERRED EMBODIMENTS

Figure 1:
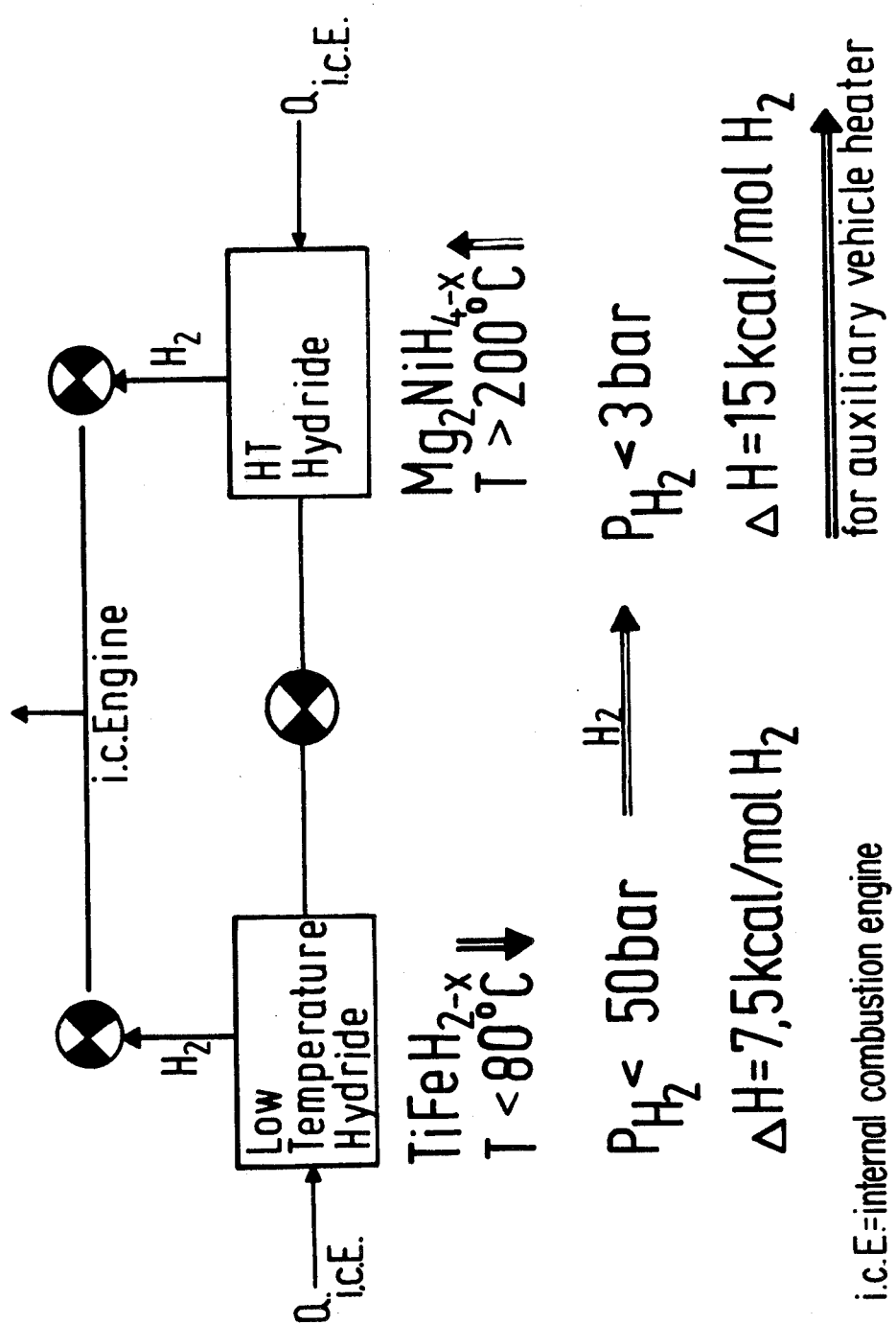
FIG. 1 is a schematic representation including a flow chart showing the transfer of heat by means of the present invention.
Figure 2:
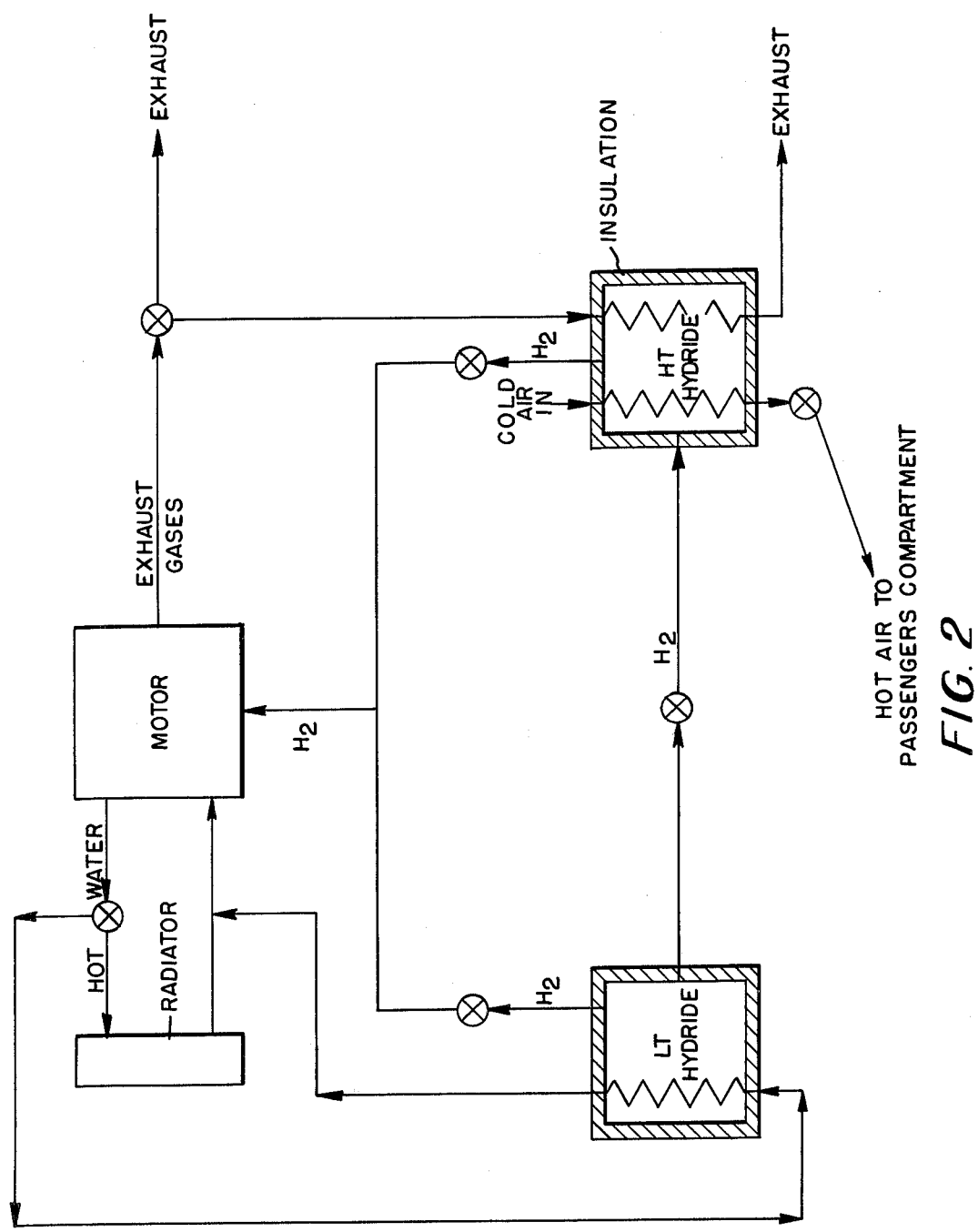
FIG. 2 is a schematic representation of the apparatus of the present invention showing the manner of connection thereof with the motor of the vehicle in which it is installed.

The operation will be described hereinbelow with reference to TiFe as the LT reservoir and $Mg_2Ni$ as the HT reservoir.

Since the LT reservoir is heated to approximately 80° C. during operation of the vehicle, but can be cooled to −20° C. until the limiting temperature is reached, at which the hydrogen pressure above the reservoir is 1 bar, this temperature difference can theoretically be utilized, although for practical reasons, only a temperature difference of approximately 60° C. to room temperature is usable.

$Mg_2Ni$ reservoirs on the other hand are operated at approximately 300° C., so that a much higher temperature difference exists here, namely upon cooling to approximately 20° C., a temperature difference of approximately 280° C. can be utilized. With an $Mg_2Ni$ reservoir as the HT reservoir, with a weight of approximately 100 kg (heated to approximately 300° C.), the heat content is approximately 7 kWh. When cooled to 20° C., for example, the HT reservoir cannot be used to restart the shut-off motor vehicle, but starting with the LT reservoir is possible, with the necessary hydrogen pressure of at least 1 bar being available at −20° C. The HT reservoir can then be brought up to reaction temperature after starting the engine using exhaust heat.

It is also possible (and this is a preferred embodiment which is important for practical applications), to produce heat for heating with the engine shut off, by transferring hydrogen from the LT reservoir to the HT reservoir. The HT reservoir will warm up. The heat required to release hydrogen from the LT reservoir will depend upon the heat capacity of the LT reservoir. Since HT reservoirs have bonding energies for hydrogen which are approximately twice as great as those of LT reservoirs, this "pumping over" of the hydrogen into the HT reservoir will release at least twice the amount of heat consumed in the LT reservoir. For example, the amount of heat provided in the case of an Mg$_2$Ni reservoir weighing 100 kg is about 3 kWh. When this amount of heat is used for heating, the high-temperature level from 200° to 250° C., at which this heat is available, is particularly important. If the hydrogen transfer is carried out in 5 to 15 minutes, the heating capacity of the HT reservoir will be 12 to 36 kW.

Another possibility, when filling the hydride reservoir with hydrogen prior to driving away, is to allow the incoming heat, which normally must be carried away, to be stored at least partially in the hydride tank, and to tap it for parking heating at a desired point in time.

The following example explains the invention. It shows the conditions for an Mg$_2$Ni/TiFe-hydride combination reservoir.

EXAMPLE

The hydrogen tank consists of an LT reservoir with 100 kg TiFe. This reservoir can hold 2 kg of hydrogen.

The HT reservoir consists of 100 kg Mg$_2$Ni and could accept 4 kg of hydrogen. A reservoir of this kind weighing 200 kg requires a total volume of approximately 100 l and gives a vehicle with a power of 44 kW a cruising range of approximately 200 km.

The 100 kg TiFe reservoir is heated by cooling water or exhaust during operation to approximately 80° C. At the same time, the 100 kg Mg$_2$Ni reservoir is heated by the exhaust to more than 200° C., normally approximately 300° C. In the present example, the final temperature of the HT reservoir was 210° to 250° C. after the engine was shut off. Due to the temperature/pressure ratio, the following data are obtained when the engine is shut off:

100 kg TiFe; 80° C.; $p_{H2}$=30 bar; $\Delta H_{H2}$=7.5 kcal;
100 kg Mg$_2$Ni; 210°–250° C.; $p_{H2}$ approx. 1 bar; $\Delta H_{H2}$=15 kcal.

The pressure in the TiFe reservoir is therefore much higher than in the Mg$_2$Ni reservoir. The bonding energy of hydrogen ($\Delta H_{H2}$) in the Mg$_2$Ni reservoir is much greater than in the TiFe reservoir. If no heat is added externally to the TiFe reservoir, the latter can cool off to approximately 0° C. (a maximum of −20° C.) by virtue of its heating capacity and thus still produce H$_2$ pressures which are above the H$_2$ absorption pressure of the Mg$_2$Ni alloy. The amount of H$_2$ which can be obtained from the TiFe tank will then be $\Delta H_{H2} \cdot m_{H2} = c_p \cdot M_{TiFe} \cdot \Delta T$ $\Delta H_{H2}$=7.5 kcal/mole TiFe°

$m_{H2}$=amount H$_2$ in moles $c_p$=24 cal/mole TiFe°

$M_{TiFe}$=1000 moles (100 kg TiFe)

$\Delta T$=80°

$7.5 \cdot 10^3 \cdot m_{H2} = 24 \cdot 10^3 \cdot 80$ $m_{H2} \approx 250$ mole H$_2$ = 500 g If these 500 g are incorporated in the Mg$_2$Ni reservoir, we will have:

$\Delta H_{H2} \cdot m_{H2} = \Delta Q$ $\Delta Q_1 = 15 \cdot 250$ kcal = 3250 kcal = 3,8 kWh If the TiFe reservoir is no more than ¼ full, or the Mg$_2$Ni reservoir is more than 8/10 hydrated, the amount of heat released will be correspondingly less.

If the amount of incident heat coming from the Mg$_2$Ni reservoir is continuously removed, the Mg$_2$Ni temperature of the 100 kg reservoir will remain constant at approximately 220° C. If this reservoir cools off to 20° C. for example, we will again have $\Delta Q_2 = c_p \cdot M \cdot \Delta T$ $c_p \geq 20$ cal/mole·degrees M = 1000 moles (100 kg Mg$_2$Ni)

$\Delta T$ = 200° C.

$\Delta Q_2 = 20 \cdot 10^3 \cdot 2 \cdot 10^2 = 4000$ kcal = 4.6 kWh

If this amount of heat is removed in 5 to 15 minutes, this means that the HT reservoir has a heating capacity of 55 to 18 kW. During the refilling process, the H$_2$ pressure of the TiFe tank is the only one which is critical; it is determined in turn by its temperature.

Thus, the hydride air-conditioning reservoir, already proposed for motor vehicles operated on LT hydride, can also be used for cooling the passenger compartment in conjunction with HT hydride reservoirs and during the cool part of the year can also be used as a zero-cost, zero-weight, and zero-fuel parking heater, whereby the hydride vehicle is ready to operate at any time, since it can be started with the LT reservoir.

It will be obvious to those skilled in the art that various changes may be made without departing from the scope of the invention and the invention is not to be considered to be limited to what is described in the specification.

What is claimed is:

1. A method for parking heating of at least the passenger compartment of motor vehicles operated at least partially on hydrogen and having a hydride reservoir, wherein the hydride reservoir is a LT/HT hydride combination, comprising supplying the heat capacity of the HT reservoir, present after the engine is shut off or produced by charging with hydrogen, at least partially to the passenger compartment.

2. A method according to claim 1, including the step of transferring hydrogen from the LT reservoir to the HT reservoir, and using the heat so produced in said supplying step.

3. A method according to claim 1, wherein said hydrides are chosen such that the $\Delta H$ values thereof are greater than 2 kcal/mole H$_2$ and the hydrogen dissociation pressure of approximately 1 bar is between +30° C. and −25° C. in the LT reservoir and at temperatures above 200° C. in the HT reservoir.

4. A method according to claim 1, wherein said hydrides are chosen such that a hydrogen ion dissociation pressure of approximately 1 bar is reached at temperatures below +20° C. in the LT reservoir, and a hydrogen dissociation pressure of approximately 1 bar is reached at temperatures of 200° to 400° C. in the HT reservoir.

5. A method in accordance with claim 4, wherein the hydride in the LT reservoir is chosen such that the hydrogen ion dissociation pressure of approximately 1 bar is reached at temperatures below 0° C.

6. A method according to claim 1, wherein the motor vehicle has a low-power engine or an engine which is operated in mixed operation with another fuel, and wherein the hydrides are selected such that the ΔH values thereof are above approximately 7 kcal/mole $H_2$.

7. A method in accordance with claim 6, wherein the hydrides are chosen such that the ΔH values thereof are above 10 kcal/mole $H_2$.

8. A method according to claim 6, wherein hydrides are selected such that the hydrides used as HT reservoirs have ΔH values at least twice as high as those of the LT reservoir.

9. A method according to claim 1, wherein the LT reservoir comprises, as the base alloy thereof, TiFe or $AX_5$, in which A is a metal of the rare earths and X is iron, cobalt, or nickel, or alloys thereof modified by doping.

10. A process in accordance with claim 9, wherein said LT reservoir base alloy is TiFe or $LaNi_5$.

11. A method according to claim 1, wherein the HT reservoir comprises, as the base alloy thereof, $Mg_2Ni$ or an alloy thereof modified by doping.

12. An apparatus for parking heating of the interior of a motor vehicle having an engine operated at least partially on hydrogen, comprising an LT/HT hydride combination reservoir means for supplying hydrogen which serves as fuel for the engine, and heat transfer means disposed in a heat-transferring connection between said reservoir means and the interior of the motor vehicle, for supplying the heat capacity of the HT reservoir at least partially to the interior of the motor vehicle.

13. An apparatus according to claim 12, wherein the LT and HT hydride reservoirs are each surrounded by heat-insulating housing and each are connected with the interior of the motor vehicle by air ducts.

14. An apparatus according to claim 13, wherein the engine has an exhaust system and wherein the hydride reservoir is additionally connected in a heat transfer manner with the exhaust system of the engine.

15. An apparatus according to claim 13, wherein the engine has a radiator and wherein the LT reservoir is connected in a heat transfer manner to the engine radiator.

* * * * *